United States Patent [19]

Gower et al.

[11] Patent Number: 4,523,949

[45] Date of Patent: Jun. 18, 1985

[54] ALUMINUM DROSS RECLAMATION

[75] Inventors: Irving W. Gower, Berwyn; Carl J. Cherry, King of Prussia; David S. Yang, Berwyn, all of Pa.

[73] Assignee: Combustion Engineering, Inc., Windsor, Conn.

[21] Appl. No.: 429,578

[22] Filed: Sep. 30, 1982

[51] Int. Cl.³ .............................................. C22B 7/04
[52] U.S. Cl. ...................................... 75/24; 423/111; 423/130; 423/133
[58] Field of Search .......................... 75/3–5, 75/24; 423/133, 111; 264/117

[56] References Cited

U.S. PATENT DOCUMENTS

| | | | |
|---|---|---|---|
| 3,309,196 | 3/1967 | Kaneko et al. | 75/257 |
| 3,442,606 | 5/1969 | Hrishikesan | 423/133 |
| 4,010,023 | 3/1977 | Bowden | 75/24 |
| 4,050,925 | 9/1977 | Johnson | 75/3 |
| 4,113,832 | 9/1978 | Bell et al. | 423/119 |
| 4,158,701 | 6/1979 | Andersen et al. | 423/133 |

FOREIGN PATENT DOCUMENTS 50-4165 2/1975 Japan ........................................ 75/3

Primary Examiner—Melvyn J. Andrews
Attorney, Agent, or Firm—Richard H. Berneike

[57] ABSTRACT

Aluminum dross containing chlorides and combustible volatile material is agglomerated and sized to produce a compact which is then treated in a direct fired rotary kiln in excess of 1800° F. to volatilize the chlorides and burn the combustible volatile material and to produce a refractory material. The flue gases containing the volatilized chlorides are then treated in a condenser where the chlorides are condensed out of the remaining flue gases. The refractory product from the kiln may be passed through a cooler wherein the heat is transferred to the combustion air.

4 Claims, 1 Drawing Figure

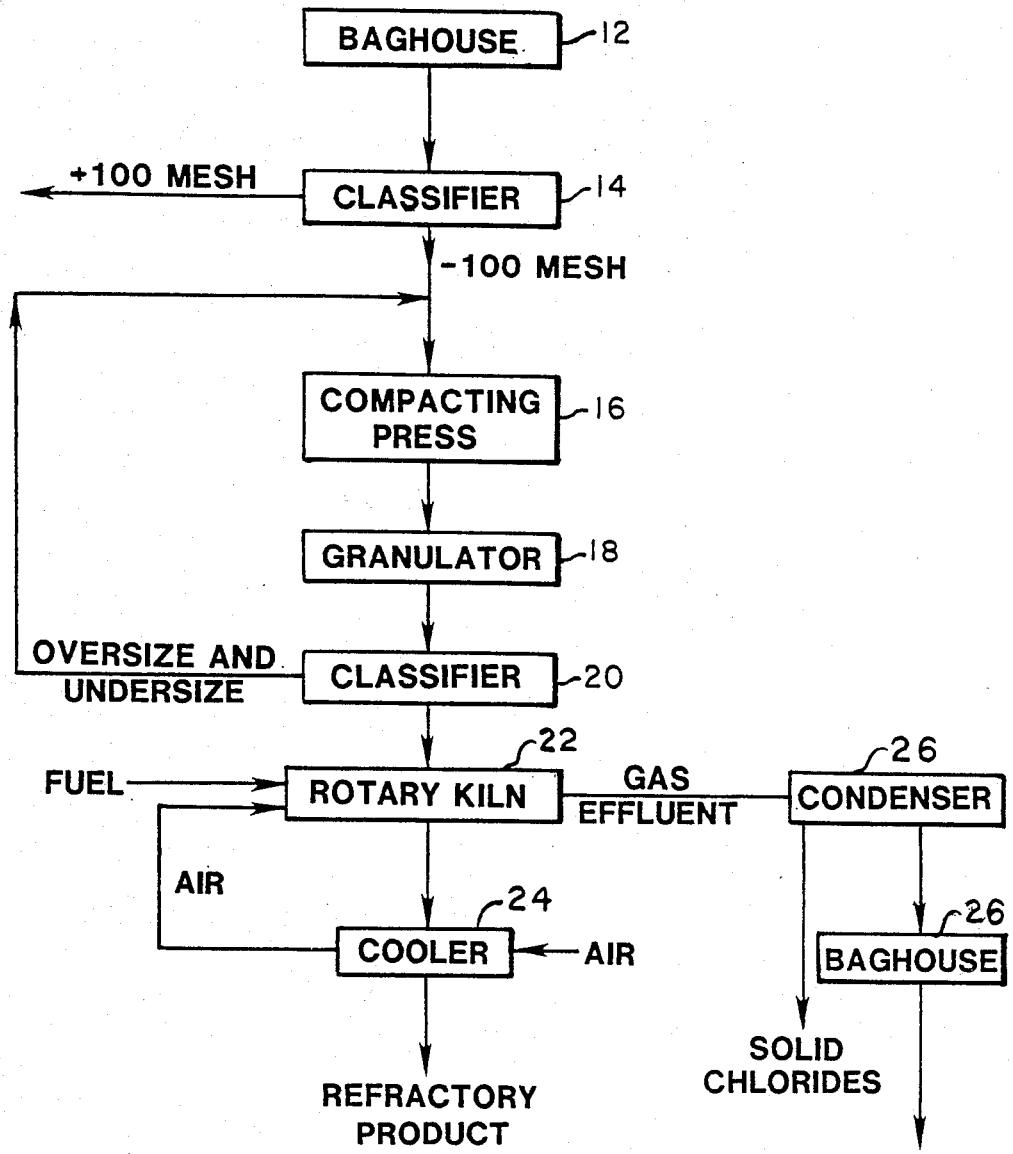

ALUMINUM DROSS RECLAMATION

BACKGROUND OF THE INVENTION

The present invention relates to the production of a useful refractory material from the waste obtained from the manufacture and processing of aluminum and aluminum alloys commonly referred to as aluminum dross.

Aluminum dross contains significant quantities of aluminum as well as refractory material such as spinel, periclase, corundum and aluminum nitride. Unfortunately, the dross also contains significant quantities of salt such as halite and sylvite. It is these salts that create the problem in the reclamation of the dross.

One of the common techniques used in reclaiming the dross is the leaching or washing of the sodium and potassium salts out of the dross with water. A significant disadvantage of the leaching process is the creation of large volumes of brine solutions that must be disposed of with methods acceptable to environmental requirements.

SUMMARY OF THE INVENTION

The present invention involves a thermal desalination and phase conversion process wherein dross of the proper size is treated in a kiln at preselected high temperatures to volatilize the salts and convert unwanted aluminum compounds to aluminum oxide or spinel. The gases from the kiln including the volatilized salts are then treated in a chemical condenser where the salts are condensed from the flue gases.

BRIEF DESCRIPTION OF THE DRAWING

The drawing is a flow diagram illustrating the process of the present invention.

DESCRIPTION OF THE PREFERRED EMBODIMENTS

The sources and composition of aluminum dross vary with the metallurgical processes from which they are derived. The chemical analysis, mineralogical analysis and particle sizes of a typical aluminum dross are as follows:

TABLE 1

| ELEMENT | % BY WEIGHT | ELEMENT | % BY WEIGHT |
| --- | --- | --- | --- |
| Be | 0.0001 | Mo | 0.001 |
| B | 0.01 | K | 3.0 |
| Ca | 0.03 | Si | 1.0 |
| Cr | 0.01 | Ag | less than 0.001 |
| Cu | 0.01 | Na | 5 to 10 |
| Ga | 0.001 | Sn | less than 0.01 |
| Fe | 0.5 | Ti | 0.3 |
| Pb | 0.001 | Va | 0.001 |
| Mg | 5 to 10 | Zn | 0.05 |
| Mn | 0.1 | $Al_2O_3$ | 85 (Estimated) |

TABLE 2

| MINERALOGICAL PHASE | % BY WEIGHT |
| --- | --- |
| Metallic Aluminum (Al) | 5 to 20 |
| Spinel ($MgAl_2O_4$) | 10 to 20 |
| Periclase (MgO) | 5 to 10 |
| Corundum ($Al_2O_3$) | 5 to 10 |
| Halite (NaCl) | 5 to 15 |
| Sylvite (KCl) | 5 to 15 |
| Aluminum Nitride (AlN) | 15 to 20 |

TABLE 3

| U.S. SIEVE SERIES | % BY WEIGHT |
| --- | --- |
| + 10 mesh | Trace |
| −10 + 20 mesh | 1.52 |
| −20 + 30 mesh | 1.52 |
| −30 + 40 mesh | 1.46 |
| −40 + 50 mesh | 1.63 |
| −50 + 70 mesh | 1.85 |
| −70 + 100 mesh | 3.02 |
| −100 + 140 mesh | 3.20 |
| −140 + 200 mesh | 8.42 |
| −200 + 270 mesh | 25.04 |
| −270 mesh | 52.31 |

The above analyses are only by way of illustration and aluminum drosses of varying composition may be treated by the process of the present invention.

As can be seen from the above particle size analysis, the dross is a very fine material which is normally collected in some sort of filter arrangement such as baghouse filter 12. Analysis of the various fractions of the grain size distribution show that the plus 100 mesh of the portion of the dross from the baghouse contains sufficient metallic aluminum to justify reclamation. Therefore, the plus 100 mesh and the minus 100 mesh particles are separated in the classifier 14 so that the valuable plus 100 mesh fraction can be diverted to other uses and the minus 100 mesh fraction processed in accordance with the present invention. The minus 100 mesh fraction has the following typical grain size distribution:

TABLE 4

| U.S. Sieve Series | % By Weight |
| --- | --- |
| + 100 mesh | 0.08 |
| −100 + 140 mesh | 4.25 |
| −140 + 200 mesh | 19.96 |
| −200 + 230 mesh | 22.75 |
| −230 + 270 mesh | 6.30 |
| −270 + 325 mesh | 8.41 |
| −325 mesh | 38.24 |

The minus 100 mesh dross fraction contains unacceptable levels of hydrocarbons, ammonia, sodium chloride, potassium chloride and a variety of aluminum compounds as well as some undesirable metallic aluminum. Dross also emits a strong smell of ammonia considered by some to render work areas unsafe without fume protection equipment. For example, if the dross should be accidently or intentionally wetted, the smell becomes much stronger and an exothermic reaction may occur causing the temperature of the dross to rise releasing large volumes of ammonia further increasing the intensity of the odor.

Initially, the incompatibility of dross and water presented a serious problem since water is the commonly used liquid in agglomerating processes. Since the dross is processed in the present invention in a kiln or other heating device having a high velocity of the throughput gases, agglomeration is necessary to prevent the minus 100 mesh dross from becoming air borne and swept away with the gases. Agglomeration provides a particle which is too heavy to be moved by the kiln's gas velocity.

The agglomeration system comprises a compacting press 16 such as the type manufactured by the Bepex Corporation of Rosemont, Ill. The minus 100 mesh dross has the unique property of forming a dense, hard compact under the pressures possible with such a compacting press. The compact may take the form of a ribbon or briquette. By using this unique property of dross, the use of water for agglomerating purposes is eliminated thus avoiding the environmental problems with ammonia gas evolution. Also, by not using liquids or other additives, the raw material costs are reduced and the possibility of introduction of impurities that could have an adverse effect on the refractory properties of the finished product is eliminated.

Since the purpose of the firing process is to remove or convert compounds that are uniformly distributed throughout the dross and thus the agglomerated compact, the dimension of the compact, particularly the maximum cross-section, are very important. The compact must be heated uniformly to volatilize the unwanted compounds and to convert other compounds to refractory compounds. The temperature and residence time in the kiln and thus the efficiency of the firing operation is directly related to the maximum allowable cross-section since the center of the compact will take longer to reach process temperatures than the exterior of the compact. Therefore, a part of the overall agglomeration process may include granulation step 18 as required for the particular kiln equipment being used. Commercially available granulation equipment such as the Bepex Granulator can be used for this purpose. Granulated compacts are then classified by conventional screening equipment 20 to remove the fractions which are too coarse and/or too fine which are then recirculated to the compacting press as shown in the drawing. As an example, the sized compacts may be from ⅛ inch to ½ inch. After forming, the properly sized compacts are stored in a surge bin equipped with volumetric feeders to regulate the rate of feed to the kiln.

The kiln 22 for the present invention is preferably a direct fired, gas fueled, rotary kiln such as manufactured by the C-E Raymond Division of Combustion Engineering. Inc. A rotary kiln is used because of the dynamic nature of the charge which allows a uniform exposure to the process temperatures and maximum exposure of the compacts to the kiln atmosphere so that volatiles can escape. Furnaces with a static charge would tend to trap the volatiles and perhaps fuse the charge into a monolith. The rotary kiln also has the advantage of discharging continuously into a cooler 24 where the sensible heat of the compacts can be recovered by preheating the combustion air.

At temperatures below 1800° F. (982° C.), hydrocarbons, ammonia, sodium and potassium compounds are volatilized. A gas analysis of the effluent shows the presence of methane, hydrogen and phosphine in addition to ammonia. Acetelyene has also been identified in the effluent. With the exception of the sodium, potassium and ammonium chlorides, all of the gases which are evolved are combustible. The firing process handles the potential environmental problems by requiring that the kiln temperature be maintained in excess of 1800° F. (982° C.) As a result, the potentially harmful gases are burned as they evolve. The kiln should be operated so that the temperature at the point where the cold compacts are introduced is at or above, 1800° F. so that volatilization of salt and hydrocarbons begins immediately. Another requirement of the process is that an excess of oxygen (oxidizing atmosphere) be maintained during firing so that the undersirable metallic aluminum and aluminum compounds will be oxidized into refractory compounds. A typical solids product of the process is as follows:

TABLE 5

| Compound | % By Weight |
|---|---|
| $Al_2O_3$ | 82.57 |
| $SiO_2$ | 1.46 |
| $Fe_2O_3$ | 0.67 |
| $K_2O$ | 0.02 |
| $Na_2O$ | 0.05 |
| N | 1.93 |
| MgO | 13.60 |
| CaO | 1.50 |

The calculated mineralogical analysis is as follows:

TABLE 6

| Phase | % By Weight |
|---|---|
| Spinel ($MgAl_2O_4$) | 48.01 |
| Corundum ($Al_2O_3$) | 43.02 |
| Aluminum Nitride (AlN) | 5.65 |
| Pyrometric Cone Equivalent | +37 (+3310 F./1821 C.) |

The gaseous effluent from the kiln which contains the flue gases, the burned effluents from the dross and from 10 to 20% by feed weight of ammonium, potassium and sodium chlorides is passed to the condenser 26. Conditions are controlled in the condenser so as to precipitate the chlorides with ammonium chloride condensing at 200° F. (93° C.) to 240° F. (116° C.) and the potassium and sodium chlorides condensing at 240° F. (116° C.) to 350° F. (177° C.) Conditions are also maintained such that these compounds will be precipitated in the dry state. The chloride chemicals can then be discharged from the condenser as a separate product stream. The gaseous effluent from condenser is then filtered at 28 for environmental purposes and then discharged to the atmosphere.

We claim:

1. A method of treating aluminum dross containing chlorides and combustible volatile material to remove said chlorides and combustible volatile material therefrom and to produce a calcined aluminum oxide refractory material comprising the steps of:
   a. agglomerating the aluminum dross in the absence of free water so as to produce dry compacts of said dross;
   b. calcining said dry compacts of said aluminum dross in a direct fired rotary kiln wherein said temperature is maintained in excess of 1800° F. whereby said chlorides and combustibles are volatilized and said combustibles are burned and said calcined aluminum oxide refractory material is formed;
   c. separating said calcined aluminum oxide refractory material from the products of combustion including said volatilized chlorides;
   d. condensing and separating said volatilized chlorides from the remaining products of combustion.

2. A method as recited in claim 1 wherein said compacts have a particle size between about ½ inch and ⅛ inch.

3. A method as recited in claim 1 and further including the step of transferring heat from said formed refractory material to the air for firing said kiln.

4. A method as recited in claim 1 wherein an excess of air is used for firing said kiln so as to maintain an oxidizing atmosphere.

* * * * *